(12) United States Patent
Bastide et al.

(10) Patent No.: US 11,489,793 B2
(45) Date of Patent: Nov. 1, 2022

(54) RESPONSE QUALIFICATION MONITORING IN REAL-TIME CHATS

(71) Applicant: International Business Machines Corporation, Armonk, NY (US)

(72) Inventors: Paul R. Bastide, Ashland, MA (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/100,888

(22) Filed: Nov. 22, 2020

(65) Prior Publication Data
US 2022/0166730 A1  May 26, 2022

(51) Int. Cl.
*H04L 51/02* (2022.01)
*H04L 65/401* (2022.01)
*H04L 65/1093* (2022.01)
*H04L 51/046* (2022.01)
*G06F 40/56* (2020.01)
*H04L 51/04* (2022.01)

(52) U.S. Cl.
CPC ............ *H04L 51/02* (2013.01); *H04L 51/046* (2013.01); *H04L 65/1093* (2013.01); *H04L 65/4015* (2013.01); *G06F 40/56* (2020.01); *H04L 51/04* (2013.01)

(58) Field of Classification Search
CPC ........ H04L 51/02; H04L 51/046; H04L 51/04
See application file for complete search history.

(56) References Cited

U.S. PATENT DOCUMENTS 10,142,300 B1    11/2018 Leavy
10,878,008 B1 *  12/2020 Cannon ............ G06Q 10/06315
(Continued)

FOREIGN PATENT DOCUMENTS

JP    2019070799 A    5/2019
JP    2019071106 A    5/2019

OTHER PUBLICATIONS

"Determining A Likely Response Time Of A User", An IP.com Prior Art Database Technical Disclosure, Disclosed Anonymously, IP.com No. IPCOM000234826D, IP.com Electronic Publication Date: Feb. 10, 2014, 3 pages.

(Continued)

*Primary Examiner* — Ryan J Jakovac
(74) *Attorney, Agent, or Firm* — David B. Woycechowsky

(57) ABSTRACT

Disclosed are techniques to model when authoritative responses are expected to be received in real-time chat dialogues to facilitate monitoring a live real-time chat and connect a participant to provide an authoritative answer at an appropriate time during the live real-time chat. Historical real-time chat dialogues are used to generate a model for when authoritative responses are expected in real-time chats. A live real-time chat is monitored for an ongoing discussion without an authoritative response, and a response latency window of the model for the live real-time chat is adjusted based on the ongoing discussion in the live real-time chat. In some embodiments, upon entering an optimal window of the ongoing discussion of the live real-time chat indicated by the model where it is determined that no authoritative response is yet received, a new participant is connected to the live real-time chat to provide an authoritative response.

12 Claims, 7 Drawing Sheets

(56) References Cited

U.S. PATENT DOCUMENTS

| | | | |
|---|---|---|---|
| 2017/0140474 A1* | 5/2017 | Tran | G06Q 50/01 |
| 2020/0036831 A1* | 1/2020 | Kim | H04L 12/1822 |
| 2021/0012352 A1* | 1/2021 | Yamagishi | H04M 3/493 |
| 2021/0029246 A1* | 1/2021 | Erhart | H04M 3/5166 |

OTHER PUBLICATIONS

"Method and System for Displaying Predicted Response Times and Alternate Paths in Social Interaction", An IP.com Prior Art Database Technical Disclosure, Disclosed Anonymously, IP.com No. IPCOM000255412D, IP.com Electronic Publication Date: Sep. 25, 2018, 3 pages.

"Method and system to predict email or collaboration systems response time", An IP.com Prior Art Database Technical Disclosure, Disclosed Anonymously, IP.com No. IPCOM000223382D, IP.com Electronic Publication Date: Nov. 20, 2012, 4 pages.

"Method for scoring responsivness in an IM environment", An IP.com Prior Art Database Technical Disclosure, Disclosed Anonymously, IP.com No. IPCOM000200371D, IP.com Electronic Publication Date: Oct. 8, 2010, 2 pages.

Delimitrou, et al., "Amdahl's Law for Tail Latency", Communications of the ACM, vol. 61, Issue 8, Jul. 2018, pp. 65-72, <https://dl.acm.org/doi/10.1145/3232559>.

Ikoro et al., "Predicting Response Waiting Time in a Chat Room", 2017 Computing Conference, Jun. 18-20, 2017, pp. 127-130.

Wang, et al., "Predicting Thread Discourse Structure over Technical Web Forums", Proceedings of the 2011 Conference on Empirical Methods in Natural Language Processing, Jul. 27-31, 2011, pp. 13-25, <https://www.aclweb.org/anthology/D11-1002/>.

* cited by examiner

RESPONSE QUALIFICATION MONITORING IN REAL-TIME CHATS

BACKGROUND

The present invention relates generally to the field of real-time chat services, and more particularly to response qualification monitoring of live real-time chats between humans.

Real-time chat may refer to any kind of communication over the internet or other computer based networks that provides a real-time transmission of text messages from sender to receiver. Chat messages are typically short in order to enable other participants to respond quickly. Thereby, an experience similar to a spoken conversation between people is generated, distinguishing chatting from other text-based online communication forms such as internet forums and email. Real-time chat may address point-to-point communications as well as multicast communications from one sender to multiple receivers, including voice and video chat, or may be one feature of a web conferencing type of service. A less stringent definition of real-time chat may encompass any direct text-based or video-based (webcams), one-on-one chat or one-to-many group chat (formally also known as synchronous conferencing), using tools such as instant messengers, Internet Relay Chat (IRC), and talkers.

Corpus linguistics refers to the study of language as expressed in corpora (samples) of "real world" text. Corpus linguistics proposes that reliable language analysis is more achievable with corpora collected in the field in its natural context ("realia"), and with minimal experimental-interference. In this context, analysis consists of statistically probing, manipulating and generalizing from the corpora forming the dataset. Analysis may also include statistical evaluations, optimization of rule-bases or knowledge discovery methods.

In natural language processing, the latent Dirichlet allocation (LDA) is a generative statistical model that enables sets of observations to be explained by unobserved groups that explain why some portions of the data are similar. For example, if observations are words collected into documents, it posits that each document is a combination of a small number of topics and that each word's presence is attributable to one of the topics in the document. LDA is one example of a topic model and belongs to the machine learning toolbox, and in wider sense to the artificial intelligence toolbox as well.

Cosine similarity is defined as a measure of similarity between two non-zero vectors of an inner product space. It is equal to the cosine of the angle between them, which is also the inner product of the same vectors normalized to both have length 1. The cosine of 0° is 1, and it is less than 1 for every angle in the interval of (0, π] radians. It is thus a quantification of orientation and not magnitude: two vectors with the same orientation result in a cosine similarity of 1, two vectors oriented at 90° relative to each other a similarity of 0, and two vectors diametrically opposed result in a similarity of −1, without regard to their magnitude. These bounds apply for any number of dimensions, but cosine similarity is most commonly used in high-dimensional positive spaces. For example, in information retrieval or text mining, each term is notionally assigned a different dimension and a document is represented by a vector where the value in each dimension corresponds to the frequency the term appears in the document. Cosine similarity then provides a useful measure for how similar two documents are likely to be in terms of their subject matter.

In mathematics and social science, a collaboration graph is a graph modeling some social network where the vertices correspond to participants of that network (usually individual people) and where two distinct participants are connected by an edge whenever there is a collaborative relationship between them of a particular kind. Collaboration graphs are frequently used to quantify the closeness of collaborative relationships between the participants of the network.

Machine learning (ML) is the study of computer algorithms which automatically improve through experience. It is typically viewed as a subset of artificial intelligence (AI). Machine learning algorithms typically construct a mathematical model based on sample data, sometimes known as "training data", in order to determine predictions or decisions without being specifically programmed to do so.

A chatbot is a software module used to conduct an on-line chat-based conversation through text or text-to-speech, instead of providing direct contact with a live human agent. Chatbots are frequently used in dialog systems for various purposes such as customer service, request routing, or for information gathering. While some chatbot applications use extensive word-classification processes, natural language processors, and sophisticated artificial intelligence, others only scan for general keywords and generate responses using common phrases obtained from an associated library or database.

SUMMARY

According to an aspect of the present invention, there is a method, computer program product and/or system that performs the following operations (not necessarily in the following order): (i) receiving a historical real-time chat dataset, including a plurality of historical real-time chat logs corresponding to chat conversations; (ii) generating an authoritative chat content model based, at least in part, on the historical real-time chat dataset, including a chat response latency window; (iii) receiving a live real-time chat data stream corresponding to a live real-time chat; (iv) monitoring a live real-time chat data stream for a question posed from a first chat participant; (v) determining, using the authoritative chat content model, an authoritative response to the question posed from the first chat participant is omitted from the live real-time chat data stream; and (vi) adjusting the chat response latency window of the authoritative chat content model based, at least in part, on the determination that an authoritative response to the question posed from the first chat participant is omitted from the live real-time chat data stream.

DETAILED DESCRIPTION

Figure 1:
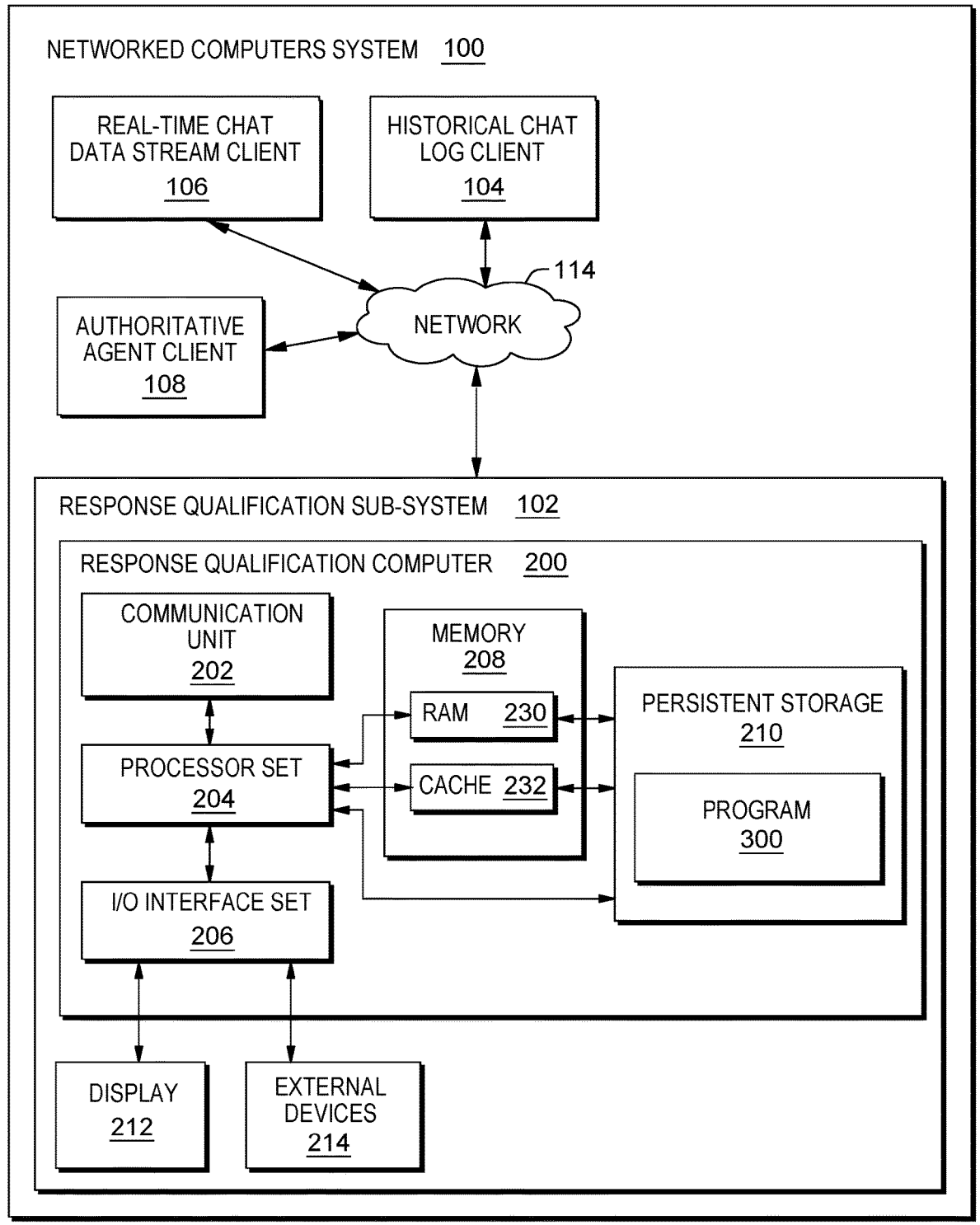
FIG. 1 is a block diagram view of a first embodiment of a system according to the present invention.

Some embodiments of the present invention are directed to techniques to model when authoritative responses are expected to be received in real-time chat dialogues to facilitate monitoring a live real-time chat and connect a participant to provide an authoritative answer at an appropriate time during the live real-time chat. Historical real-time chat dialogues are used to generate a model for when authoritative responses are expected in real-time chats. A live real-time chat is monitored for an ongoing discussion without an authoritative response, and a response latency window of the model for the live real-time chat is adjusted based on the ongoing discussion in the live real-time chat. In some embodiments, upon entering an optimal window of the ongoing discussion of the live real-time chat indicated by the model where it is determined that no authoritative response is yet received, a new participant is connected to the live real-time chat to provide an authoritative response.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: response qualification subsystem 102 (sometimes herein referred to, more simply, as subsystem 102); historical chat log client 104; real-time chat data stream client 106; authoritative agent client 108; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
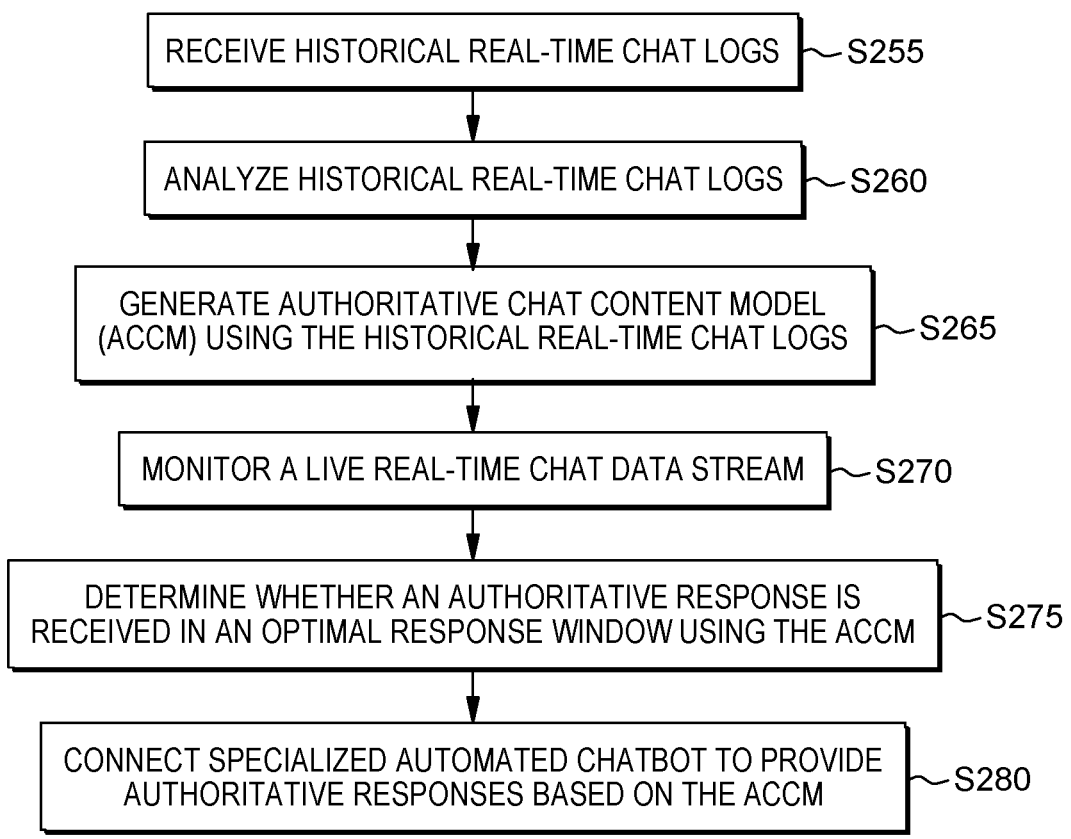
FIG. 2 is a flowchart showing a first embodiment method performed, at least in part, by the first embodiment system.
Figure 3:
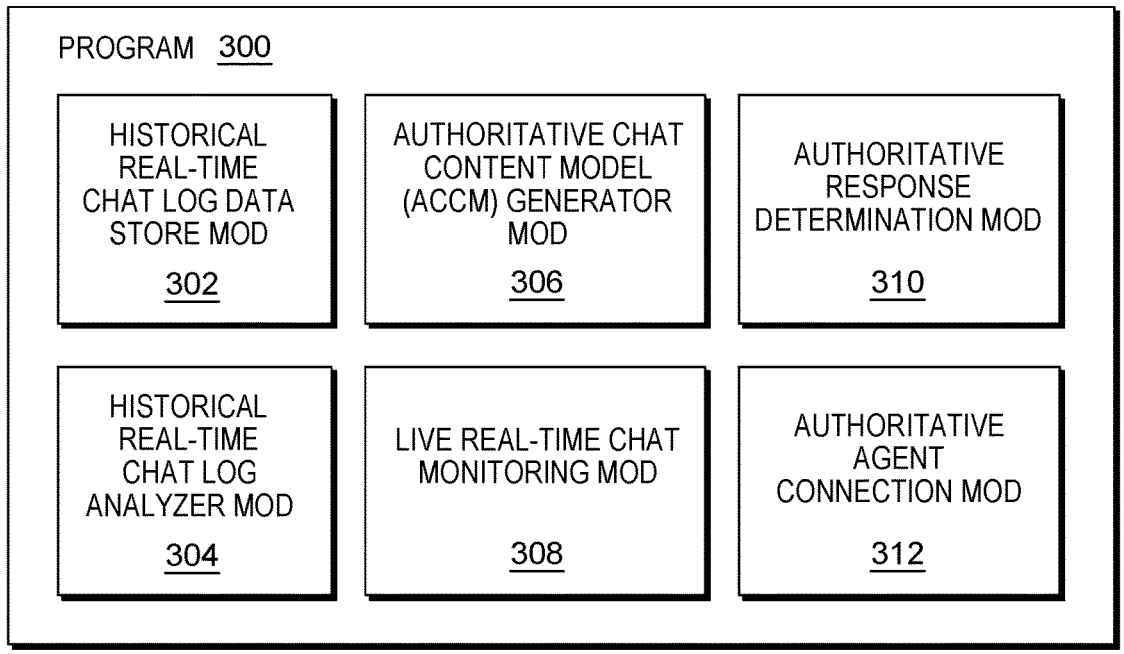
FIG. 3 is a block diagram showing a machine logic (for example, software) portion of the first embodiment system.
Figure 4:
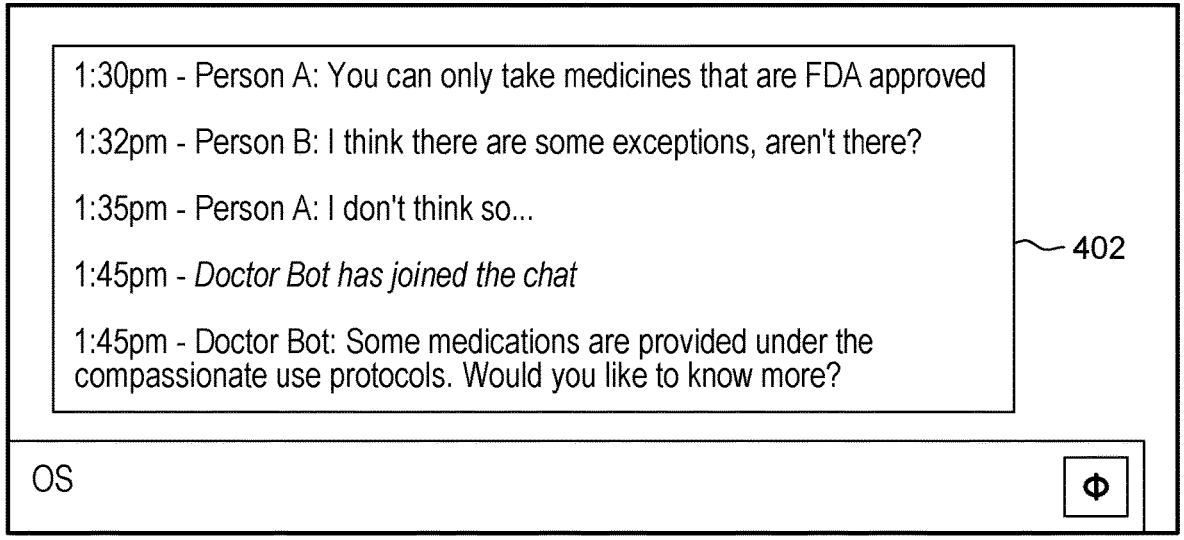
FIG. 4 is a screenshot view generated by the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2, 3 and 4.

Processing begins at operation S255, where historical real-time chat log data store mod module ("mod") 302 receives historical real-time chat logs. In this simplified embodiment, the historical real-time chat logs include a multitude of historical real-time chat logs received from historical chat log client 104 over network 114, where each historical real-time chat log is a log of all the messages exchanged between participants in a real-time chat log corresponding to a conversation concerning medical information. In this simplified embodiment, the historical real-time chat logs are all from a single chat application: Acme Chat. In some alternative embodiments, the historical real-time chat logs are from a plurality of platforms and forums, chat channels, etc. In some alternative embodiments, the conversation subjects for the historical real-time chat logs are varied, including: (i) legal discussions; (ii) technical engineering discussions; (iii) financial regulatory discussions; (iv) medical governing body discussions; and (v) legal governing body discussions. In some alternative embodiments, the historical real-time chat logs are sourced from a variety of interpersonal communication media, such as: (i) different real-time chat platforms; and (ii) different real-time chat channels within a real-time chat platform.

Processing proceeds to operation S260, where historical real-time chat log analyzer mod 304 analyzes the historical real-time chat logs. In this simplified embodiment, analyzing the historical real-time chat logs includes analyzing the historical real-time chat logs for: (i) corpus linguistics; (ii) message inter-arrival time; and (iii) collaborative author graphs. In this simplified embodiment, message inter-arrival time refers to the time between two messages arriving in the historical real-time chat log. For example, the amount of time between a first message arriving in the chat at time t0 and a second message arriving in the chat at time t1. Also, in this simplified embodiment collaborative author graphs refers to a collaboration graph denoting collaborative relationships between chat participants in a given historical real-time chat log such as engagement in a mutual discussion where at least one participant responds to a message authored by another participant.

Processing proceeds to operation S265, where authoritative chat content model (ACCM) generator mod 306 generates an ACCM using the historical real-time chat logs. In this simplified embodiment, generating the ACCM includes leveraging the analysis from S260 to generate an ACCM that determines the correlation between a chat conversation is started and when an authoritative response resolving the chat conversation has been received. More specifically, the ACCM determines when an authoritative response is typically received and what constitutes a typical authoritative response or how a given chat discussion behaves after an authoritative response is received. The ACCM is based on one or more of the following: (i) corpus linguistics analysis of the historical real-time chat logs; (ii) cosine similarity applied to the messages of the historical real-time chat logs; (iii) Latent Dirichlet Allocation of the historical real-time chat logs; and (iv) inter-arrival time analysis of messages in the historical real-time chat logs. In this simplified embodiment, the ACCM is directed towards medical discussions among anonymized individuals and professionals, and as such, the ACCM further considers regulatory restrictions, such as those set out by the Food and Drug Administration (FDA) of the US federal government, when determining authoritative responses versus non-authoritative messages in a given historical real-time chat log.

In some alternative embodiments, other restrictions guide the ACCM, such as: (i) Financial Industry Regulatory Authority (FINRA); (ii) U.S. Securities and Exchange Commission (SEC); (iii) Federal Trade Commission (FTC); (iv) Centers for Disease Control and Prevention (CDC); (v) good practice quality guidelines and regulations (GxP); and (vi) formal criminal statutes or codes. In some alternative embodiments, the ACCM rates different sources for authoritativeness relative to a given topic, such as: (i) various interpersonal communication media; (ii) official government websites; (iii) official regulatory body websites; (iv) discussion forums for a given domain or subject. The ACCM may rank different sub-sections of any of these sources independently from other subsections, or provide a ranking to the overall platform for a given source (such as all sub-sections of Example Discussion Website). The rankings describe a rate of authoritative responses, with one example ranking being high, medium, and low rates of authoritative responses. In some alternative embodiments, such rankings are also applied to the historical real-time chat logs and/or their corresponding sources.

Processing proceeds to operation S270, where live real-time chat monitoring mod 308 monitors a live real-time chat data stream. In this simplified embodiment, the live real-time chat stream is received from real-time chat data stream client 106 through network 114. Further, in this simplified embodiment, monitoring includes monitoring the contents of each message published to the live real-time chat stream as they are published, the identity of the author of each message as the message is published to the stream, and the inter-arrival time since a previous message was published to the stream.

Processing proceeds to operation S275, where authoritative response determination mod 310 determines whether an authoritative response is received in an optimal response window using the ACCM. In this simplified embodiment, the generated ACCM is applied by authoritative response determination mod 310 to determine if an authoritative response has been received in the monitored live real-time chat stream. The ACCM does this by processing the current state of the monitored live real-time chat stream, including: the contents of each message published to the live real-time chat stream as they are published, the identity of the author of each message as the message is published to the stream, and the inter-arrival time since a previous message was published to the stream. The ACCM then models a distribution graph projecting where messages and subsequent responses fall along a distribution where an authoritative response is expected during a certain optimal window, instead of early or belated. Then, analyzing the identity of authors and contents of messages (if any) that have been published in the optimal window of the distribution graph, the ACCM determines if any of the messages in the optimal window constitute an authoritative response, while considering FDA regulations. For example, a response from a layperson that includes generalized health information such as "maybe try drinking some water?" in the optimal window might be considered a non-authoritative message or response if the original response included a description of a patient who's complaining of frequent coughing, while more specific medical advice from a medical professional such as a doctor that evokes the proper medical terminology as recognized by regulatory authorities such as in FDA regulations. In this simplified embodiment, the ACCM determines that no authoritative responses are received in the optimal window. In an alternative embodiment, where the ACCM determines that an authoritative response was published in the optimal window, monitoring continues to determine if another query is published, and for subsequent responses in the optimal distribution window to the other query. In some alternative embodiments, if an authoritative response is determined outside of the optimal window, and the live real-time chat data stream indicates that the authoritative response resolved the discussion, the ACCM updates the optimal distribution window based on the authoritative response that was outside of the optimal window.

Processing proceeds to operation S280, where authoritative agent connection mod 312 connects a specialized automated chatbot to provide authoritative responses based on the ACCM. In this simplified embodiment, the authoritative agent is a specialized chatbot, called "Doctor Bot" which is hosted on authoritative agent client 108. Authoritative agent connection mod 312 connects Doctor Bot to the live real-time chat corresponding to the live real-time chat data stream hosted on real-time chat data stream client 106, augmenting the live real-time chat with an authoritative agent to provide an authoritative response. In this simplified example embodiment, Doctor Bot is provided the messages published to the live real-time chat data stream to determine a relevant, authoritative message to resolve an ongoing discussion in the live real-time chat data stream, considering the FDA regulations and other relevant regulations, resulting from an absence of authoritative answers published by the other chat participants in the live real-time chat data stream, resulting in a chat dialogue such as in live real-time chat 402 of screenshot 400 of FIG. 4.

In some alternative embodiments, an individual previously identified as possessing authoritative knowledge in a given domain is connected to the live real-time data stream to provide an authoritative response to the ongoing discussion in the live real-time chat. Authoritative agent connection mod 312, using the ACCM, selects one individual from a plurality of individuals as a candidate for authoring an authoritative response, provides the selected candidate with the previous messages published to the live real-time chat data stream, and automatically connects the selected candidate to the live real-time chat as a new participant flagged as an authoritative participant. In some alternative embodiments, the ACCM analyzes published works authored by potential candidates to determine if a potential candidate possesses specialized knowledge relevant to delivering an authoritative response in the discussion of the live real-time chat, such as published journal articles.

III. Further Comments and/or Embodiments

Some embodiments of the present invention recognize the following facts, potential problems and/or potential areas for improvement with respect to the current state of the art: (i) Response Latency is the time span between a stimulus and a response or reaction; (ii) many attempts have been made to solve conversation response latency in a group chat, but none solve the problem with a high degree of fidelity; (iii) for example, there are situations whereby discourse utterances can happen in a burst manner or have a much longer reflection process; (iv) some solutions have explored how to determine an optimal response time required based on the perception of the sender; (v) however one unaddressed problem is that of an authoritative response; (vi) for example, modelling the optimal distribution is a non-trivial task; (vii) however, within that distribution window, there is a problem as to the determination of a qualified response; and (ix) a similar class of problems has been observed in other fields, such as data-center hardware and software architectures.

Some embodiments of the present invention may include one, or more, of the following operations, features, characteristics and/or advantages: (i) detection of an authoritative response; (ii) adjusts the response latency accordingly along with a bridged knowledge engagement; (iii) analyze (inter arrival time of chat, corpus linguistic analysis, group chat author tuple); (iv) derive, based on the analysis, an authoritative chat content model (ACCM); (v) determine, using the ACCM, whether an authoritative response has been received; (vi) analyze the text content of a question and also analyze the text content of a response; (vii) by analyzing the cosine similarity of the response versus the question, infer the probability of whether the response is authoritative; (viii) in other words, using topic modeling on the words used in a question and response and a corresponding log likelihood score to measure the distance between the terms; (ix) adjust chat response latency window based on qualitative response assessment; (x) trigger an engagement with an authoritative figure to bridge the gap in knowledge and responses as required; (xi) the authoritative figure may include an automated intelligent agent or a facilitated conversation with an authoritative individual; (xii) the ACCM can be scoped to distinct Fora (Reddit, Stack overflow) and chat channels (Slack workspaces) to rank mediums with high, medium or low authoritative response; (xiii) the ACCM can embody the learning from training across any number of instant message channels, for example; (xiv) if the user asked questions outside of the instant message platform on a web-based forum, the ACCM model could be embodied within JavaScript (for example) to allow for cross platform support; (xv) the ACCM may be trained using a trusted chat space of individuals with authority discussing topics and applying to an untrusted chat space; and (xvi) the ACCM may be scoped based on industry or perspective of authority—e.g. local government, medical professional, medical governing body (Joint Commission), financial regulatory body.

Some embodiments of the present invention may include one, or more, of the following operations, features, characteristics and/or advantages: (i) the ACCM may be used as a keep-alive to the conversation when an existing conversation is not yet responded; (ii) the ACCM may be used to determine risks with responses; (iii) risks with responses refers to an answer that is provided to a question that is either wholly or partially incorrect; (iv) for example a user may ask a question about how to join two dataframes in Python; (v) an answer may be provided that is syntactically incorrect, or wholly incorrect; (vi) or the answer may work only with a specific version of Python (e.g. Python 2.7x), which is only partially incorrect; (vii) validating such answers against programming API documentation; (viii) determine a risk score as to whether such an answer is indeed authoritative, partially or wholly incorrect; (ix) the engagement trigger may fire off adversarial authoritative agents; (x) for example, competitive companies, products that compete and governmental entities; (xi) in a more specific example, cleaning liquid discussion has two ACCM models/agents with authority on two distinct and competitive products; (xii) the ACCM trigger window may be determined based on the risk related to the activity being discussed; (xiii) for example, drug-to-drug interaction, regulatory violation, likely harm, implied doubts in the text; (xiv) providing a real-chat user with a measure of both response latency and authoritative responses within the real-time chat domain; and (xv) combining corpus linguistic analysis and author frequency analysis to produce the fidelity of solution that some embodiments of the present invention provides for this problem space.

Figure 5:
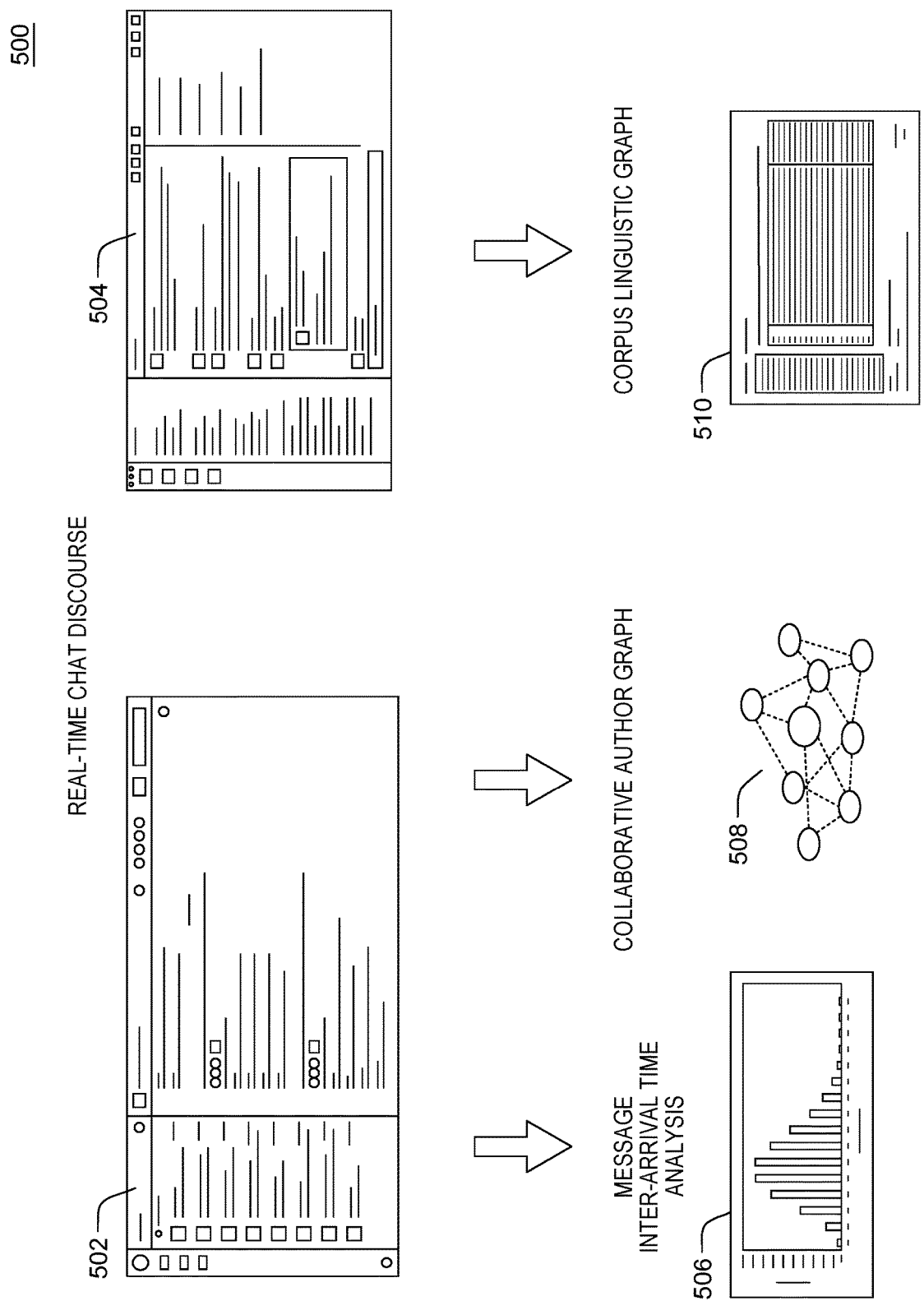
FIG. 5 is a screenshot view of a first step of a process according to a second embodiment of the present invention.

According to a second embodiment of the present invention, screenshot 500 of FIG. 5 shows an analysis step for analyzing content of a real-time chat discourse (such as real-time chat 502 or 504) to determine: (i) message inter-arrival time analysis 506; (ii) collaborative author graph 508; and (iii) corpus linguistic analysis 510. In this analysis step, the embodiment analyzes: (inter arrival time of chat, corpus linguistic analysis, group chat author tuple).

Figure 6:
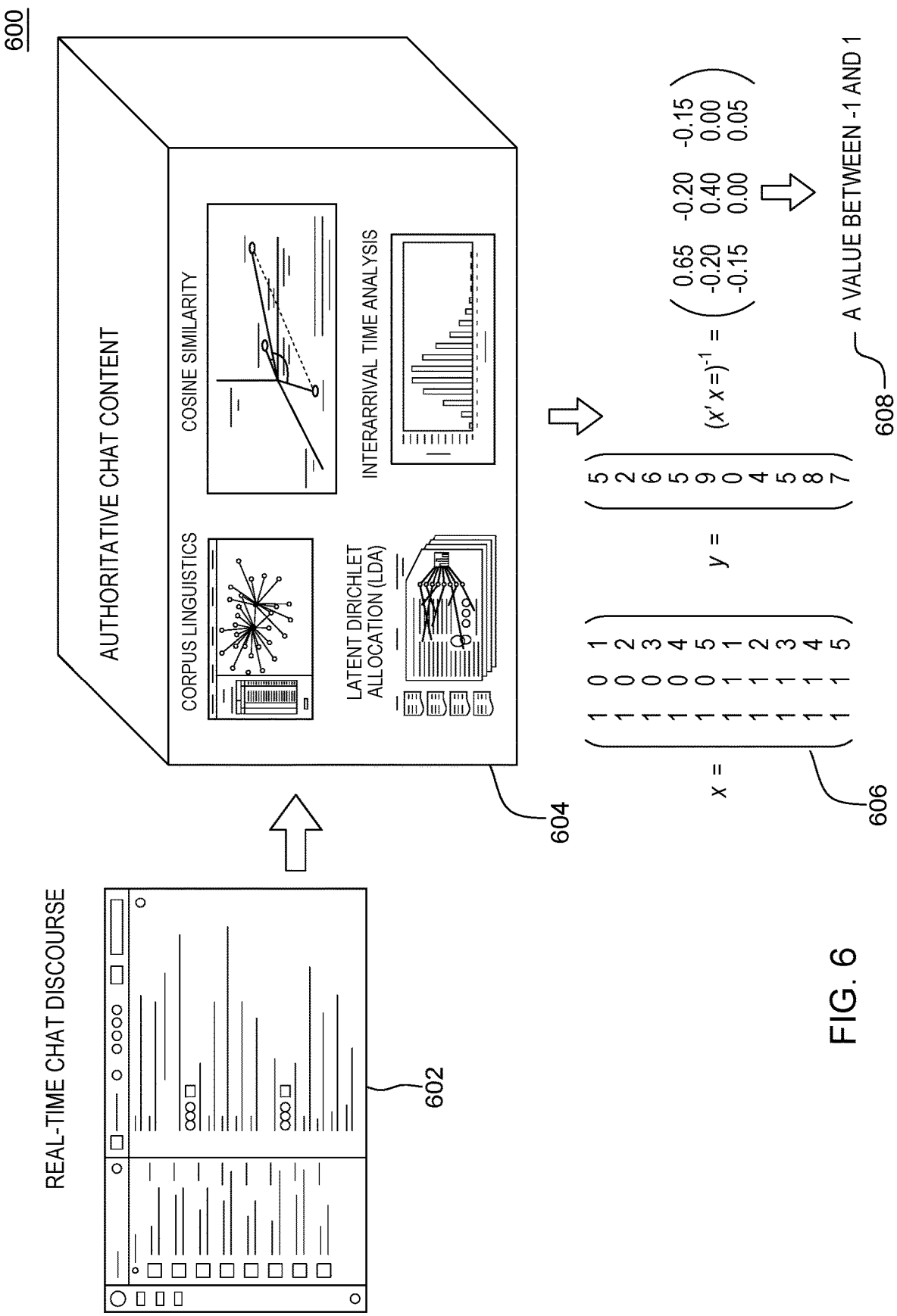
FIG. 6 is a screenshot view of a second step of a process according to the second embodiment of the present invention.

According to the second embodiment of the present invention, screenshot 600 of FIG. 6 shows a step where an authoritative chat content model is determined. Using previous analysis, such as that shown in screenshot 500 of FIG. 5, real-time chat discourse 602 is used to determine authoritative chat content model 604, which outputs numerical values 606 and 608 that correspond to a correlation of authoritativeness of chat content in a real-time chat discourse such as 602. In this second embodiment, based on the previous analysis such as in FIG. 5, an authoritative chat content model (ACCM) is derived. The authoritative chat model considers regulatory restrictions—financial (FINRA, SEC, FTC), healthcare (OIC, CDC, GxP, FDA), legal (criminal). Each regulatory restriction may be trained independently.

Figure 7:
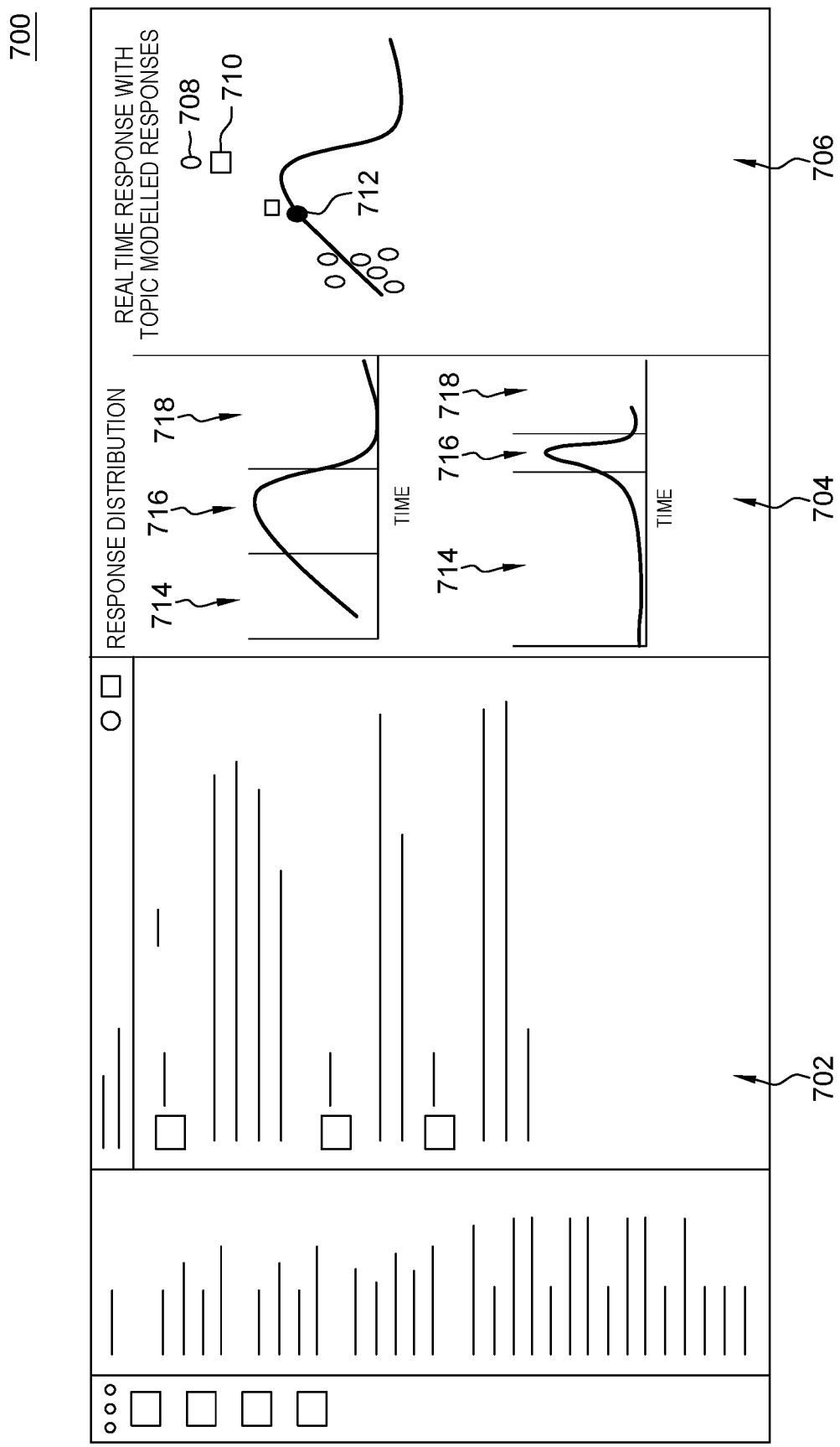
FIG. 7 is a screenshot view of a third step of a process according to the second embodiment of the present invention.

According to the second embodiment of the present invention, screenshot 700 of FIG. 7 shows a step where an authoritative chat content model, or ACCM (such as that determined in screenshot 600 of FIG. 6) is used to determine whether an authoritative response is received in real-time chat discourse 702, as shown in response distribution 704 and model 706 showing realtime response with topic modeled responses. In a first sub-step, the ACCM derives the response latency distribution for a message based on the id of the author of the message and corpus linguistics analysis. An overlay graphic is provided to show the optimal response window. At a second sub-step, a user is provided a real-time monitor that provides telemetry of where the chat lies in terms of the response window. At a third sub-step, when a user provides a response, scores of the responses are surfaced as an overlay on the response distribution window. Elements 708 and 710 correspond to labels for model 706, respectively describing non-authoritative response and authoritative responses. Element 712 corresponds to an example present location of a live real-time chat modeled in model 706. Elements 714, 716 and 718 correspond to premature, optimal, and belated response windows on a response distribution graph, respectively.

Figure 8:
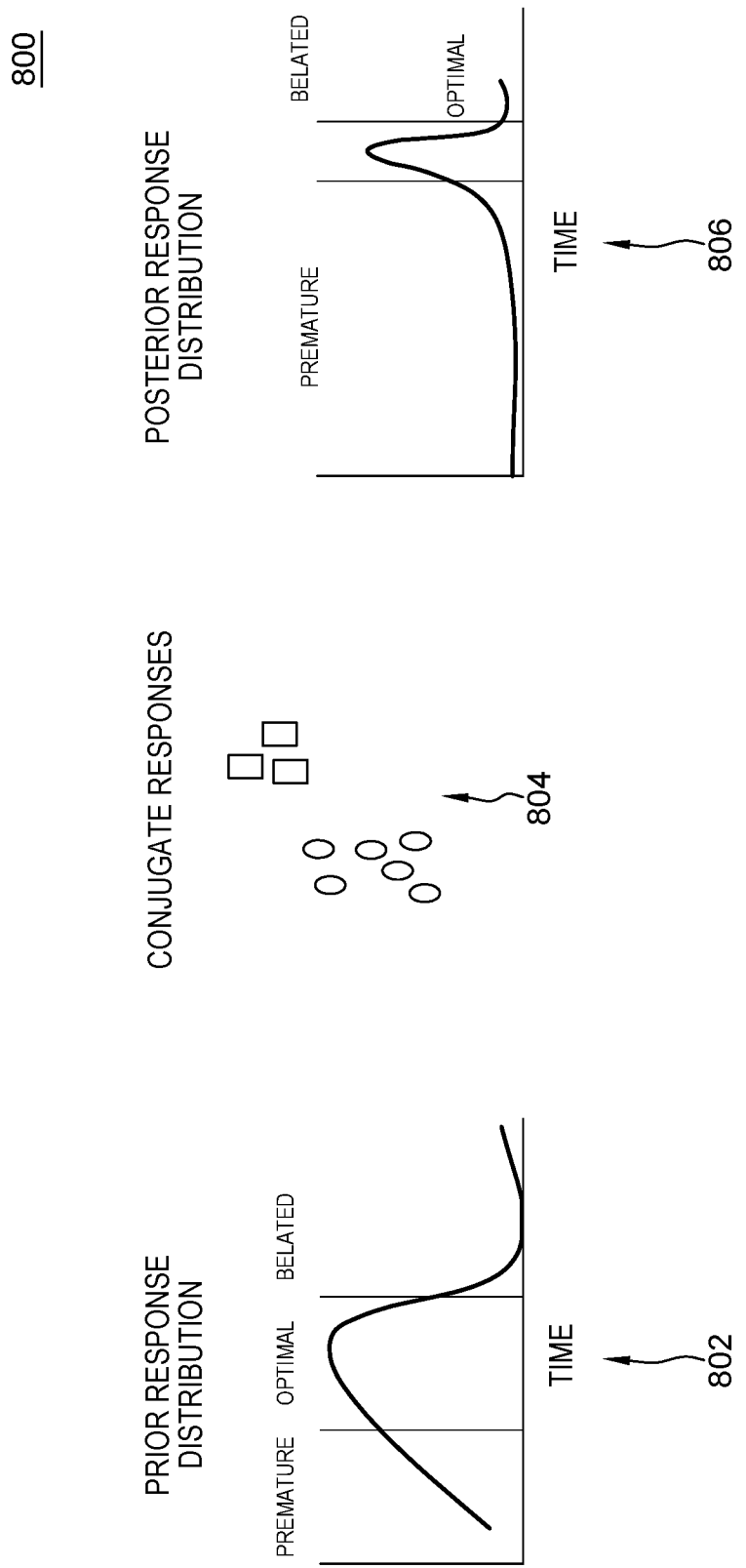
FIG. 8 is a screenshot view of a fourth step of a process according to the second embodiment of the present invention.

According to the second embodiment of the present invention, screenshot 800 of FIG. 8 shows a step where a chat response latency window is adjusted based on a qualitative response assessment. Prior response distribution 802, showing a chat response distribution prior to adjustment, is adjusted to posterior response distribution 806 based, at least partially, on conjugate responses 804.

Some embodiments of the present invention may include one, or more, of the following operations, features, characteristics and/or advantages: (i) an engagement trigger with an authoritative figure to bridge the gap in knowledge and responses as required; (ii) the engagement trigger generates a side conversation with an authority figure in the subject, as determined using expertise location, the number, badges or a vote with the members of the conversation, or prior responders; (iii) upon determining that a response is not yet received with authority, the engagement trigger may reduce the acceptable language and linguistic profile of the response in order to further narrow the acceptable response, rather than allow needless and potentially harmful responses; (iv) in a medical and healthcare scenario, the invention may use an engagement trigger which identifies local authority when there is a potential for harm, and activate the person or persons with access to the chat to respond; (v) in an advise chat, "what should I do with my 401k?" asked in a financial channel, a bot may be used to monitor the engagement levels of the senders/receivers and activate agents to continue and inspire an authoritative dialog using the authoritative response; (vi) in responses which are deemed authoritative, the responses are badged with identifiers which dictate an authoritative response; and (vii) infer whether an authoritative response has been received.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method (CIM) comprising:
receiving a historical chat conversation dataset, including information indicative of content of a plurality of chat conversations conducted in natural language on one, or more, computerized chat platform(s);
analyzing, by machine logic, the plurality of chat conversations to obtain analysis output data that includes information relating to collaborative author graphs that are based, at least in part, on the chat conversations;
generating an authoritative chat content model based, at least in part, on the analysis output data, with the authoritative chat content model including a set of chat response latency window value(s), and the authoritative chat content model determines authoritative responses in a chat data stream through cosine similarity analysis between contents of queries and answers in the historical chat conversation dataset;
receiving a live real-time chat data stream corresponding to a live real-time chat; and
monitoring the live real-time chat data stream to determine that one, or more, question(s) are being left unanswered in the course of the live real-time chat; and
responsive to the determination that questions are being left unanswered, adjusting the set of chat response latency window value(s):
wherein:
the authoritative chat content model determines authoritative responses in a chat data streams further based, at least in part, comparing contents of responses to regulatory resources corresponding to the queries in the chat data stream;
regulatory resources are selected from the group comprising: (i) official government websites, and (ii) official regulatory body websites; and
the authoritative chat content model applies different weights to different regulatory resources corresponding to their relative authoritativeness for answers to queries concerning a given topic.

2. The CIM of claim 1, wherein the adjustment to the set of chat response latency window value(s) takes the form of an increase in one, or more, chat response latency window value(s).

3. The CIM of claim 1, wherein analysis output data that includes information relating to message inter-arrival time values characteristic of the chat conversations.

4. The CIM of claim 1, wherein analysis output data that includes information relating to corpus linguistics used in the plurality of chat conversations.

5. A computer program product (CPP) comprising:
a set of storage device(s); and
computer code stored collectively in the set of storage device(s), with the computer code including data and instructions to cause a processor(s) set to perform at least the following operations:
receiving a historical chat conversation dataset, including information indicative of content of a plurality of chat conversations conducted in natural language on one, or more, computerized chat platform(s),
analyzing, by machine logic, the plurality of chat conversations to obtain analysis output data that includes information relating to collaborative author graphs that are based, at least in part, on the chat conversations,
generating an authoritative chat content model based, at least in part, on the analysis output data, with the authoritative chat content model including a set of chat response latency window value(s), and the authoritative chat content model determines authoritative responses in a chat data stream through cosine similarity analysis between contents of queries and answers in the historical chat conversation dataset,
receiving a live real-time chat data stream corresponding to a live real-time chat, and
monitoring the live real-time chat data stream to determine that one, or more, question(s) are being left unanswered in the course of the live real-time chat, and
responsive to the determination that questions are being left unanswered, adjusting the set of chat response latency window value(s):

wherein:
the authoritative chat content model determines authoritative responses in a chat data streams further based, at least in part, comparing contents of responses to regulatory resources corresponding to the queries in the chat data stream,
regulatory resources are selected from the group comprising: (i) official government websites, and (ii) official regulatory body websites, and
the authoritative chat content model applies different weights to different regulatory resources corresponding to their relative authoritativeness for answers to queries concerning a given topic.

6. The CPP of claim 5, wherein the adjustment to the set of chat response latency window value(s) takes the form of an increase in one, or more, chat response latency window value(s).

7. The CPP of claim 5, wherein analysis output data that includes information relating to message inter-arrival time values characteristic of the chat conversations.

8. The CPP of claim 5, wherein analysis output data that includes information relating to corpus linguistics used in the plurality of chat conversations.

9. A computer system (CS) comprising:
a processor(s) set;
a set of storage device(s); and
computer code stored collectively in the set of storage device(s), with the computer code including data and instructions to cause the processor(s) set to perform at least the following operations:
receiving a historical chat conversation dataset, including information indicative of content of a plurality of chat conversations conducted in natural language on one, or more, computerized chat platform(s),
analyzing, by machine logic, the plurality of chat conversations to obtain analysis output data that includes information relating to collaborative author graphs that are based, at least in part, on the chat conversations,
generating an authoritative chat content model based, at least in part, on the analysis output data, with the authoritative chat content model including a set of chat response latency window value(s), and the authoritative chat content model determines authoritative responses in a chat data stream through cosine similarity analysis between contents of queries and answers in the historical chat conversation dataset,
receiving a live real-time chat data stream corresponding to a live real-time chat, and
monitoring the live real-time chat data stream to determine that one, or more, question(s) are being left unanswered in the course of the live real-time chat, and
responsive to the determination that questions are being left unanswered, adjusting the set of chat response latency window value(s):
wherein:
the authoritative chat content model determines authoritative responses in a chat data streams further based, at least in part, comparing contents of responses to regulatory resources corresponding to the queries in the chat data stream,
regulatory resources are selected from the group comprising: (i) official government websites, and (ii) official regulatory body websites, and
the authoritative chat content model applies different weights to different regulatory resources corresponding to their relative authoritativeness for answers to queries concerning a given topic.

10. The CS of claim 9, wherein the adjustment to the set of chat response latency window value(s) takes the form of an increase in one, or more, chat response latency window value(s).

11. The CS of claim 9, wherein analysis output data that includes information relating to message inter-arrival time values characteristic of the chat conversations.

12. The CS of claim 9, wherein analysis output data that includes information relating to corpus linguistics used in the plurality of chat conversations.

* * * * *